US011835659B2

(12) United States Patent
Ding et al.

(10) Patent No.: US 11,835,659 B2
(45) Date of Patent: Dec. 5, 2023

(54) TIME-OF-FLIGHT APPARATUS AND METHOD

(71) Applicant: Sony Semiconductor Solutions Corporation, Kanagawa (JP)

(72) Inventors: Qing Ding, Stuttgart (DE); Ward Van Der Tempel, Muizen (BE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 557 days.

(21) Appl. No.: 16/791,584

(22) Filed: Feb. 14, 2020

(65) Prior Publication Data

US 2020/0264285 A1 Aug. 20, 2020

(30) Foreign Application Priority Data

Feb. 15, 2019 (EP) ..................................... 19157380

(51) Int. Cl.
  *G01S 17/10* (2020.01)
  *G01S 7/4863* (2020.01)
(52) U.S. Cl.
  CPC ............ *G01S 7/4863* (2013.01); *G01S 17/10* (2013.01)

(58) Field of Classification Search
None
See application file for complete search history.

(56) References Cited

U.S. PATENT DOCUMENTS

| | | | |
|---|---|---|---|
| 2009/0017839 A1* | 1/2009 | Kim .................... | H04W 12/088 455/456.1 |
| 2016/0146595 A1 | 5/2016 | Boufounos et al. | |
| 2017/0091947 A1 | 3/2017 | Baruch et al. | |
| 2018/0100926 A1* | 4/2018 | Boufounos ........... | G01S 7/4802 |
| 2018/0149748 A1 | 5/2018 | Yang et al. | |
| 2018/0209846 A1* | 7/2018 | Mandai ................ | G01S 17/894 |
| 2018/0246212 A1 | 8/2018 | Moore et al. | |
| 2019/0056497 A1* | 2/2019 | Pacala .................. | G01S 7/4863 |
| 2020/0097752 A1* | 3/2020 | De Salivet de Fouchecour .......... G01S 17/894 |

* cited by examiner

*Primary Examiner* — Eileen M Adams
(74) *Attorney, Agent, or Firm* — Wolf, Greenfield & Sacks, P.C.

(57) ABSTRACT

A time-of-flight apparatus having a light detector for detecting light reflected from a scene, wherein the light detector has at least one light detection element; and circuitry configured to acquire light detection events for the at least one light detection element at selected points of time of a set of predetermined number of consecutive times, wherein the selection of the points of time is based on a time compressive sampling.

19 Claims, 8 Drawing Sheets a)

b)

TIME-OF-FLIGHT APPARATUS AND METHOD

CROSS-REFERENCE TO RELATED APPLICATIONS

The present application claims priority to European Patent Application 19157380.7 filed by in the European Patent Office on Feb. 15, 2019, the entire contents of which being incorporated herein by reference.

TECHNICAL FIELD

The present disclosure generally pertains to a time-of-flight apparatus and a method for controlling a time-of-flight apparatus.

TECHNICAL BACKGROUND

Typically, known time-of-flight (ToF) systems have a light source for illuminating a region of interest and a sensor for detecting light stemming from the region of interest for determining a distance between the light source and the region of interest or for generating a depth map of a region of interest. The distance can be determined, for example, based on the time-of-flight of the photons of the light source reflected in the region of interest, which, in turn, is associated with the distance, and it can be based, for example, on a direct trip time of the light when travelling from the light source to the sensor. The depth map can be generated based on a derived distance information.

Although, generally, there exist a time-of-flight apparatus and a method for controlling a time-of-flight apparatus, it is generally desirable to provide an improved time-of-flight apparatus and a method for controlling a time-of-flight apparatus.

SUMMARY

According to a first aspect, the disclosure provides a time-of-flight apparatus, comprising a light detector for detecting light reflected from a scene, wherein the light detector has at least one light detection element; and circuitry configured to acquire light detection events for the at least one light detection element at selected points of time of a set of predetermined number of consecutive times, wherein the selection of the points of time is based on a time compressive sampling.

According to a second aspect, the disclosure provides a method for controlling a time-of-flight apparatus, comprising a light detector for detecting light reflected from a scene, wherein the light detector has at least one light detection element, the method comprising acquiring light detection events for the at least one light detection element at selected points of time of a set of predetermined number of consecutive times, wherein the selection of the points of time is based on a time compressive sampling.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
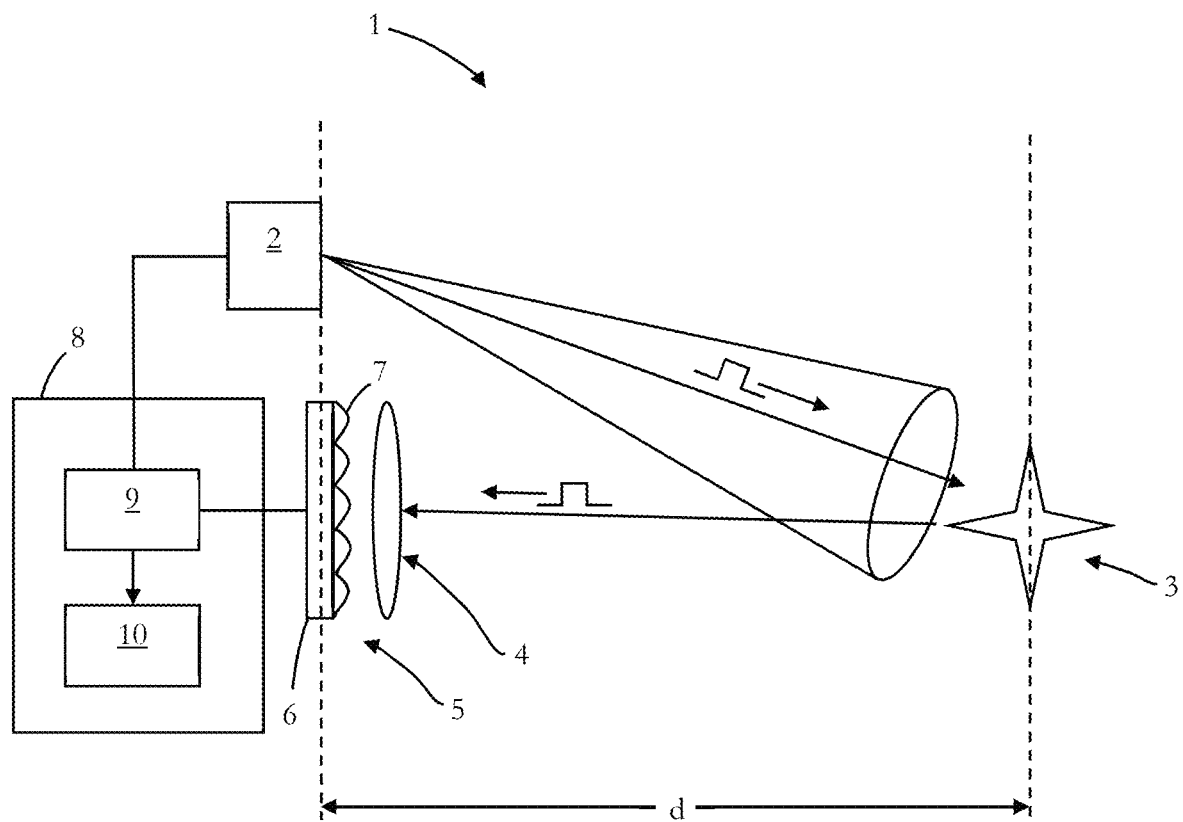
FIG. 1 illustrates an embodiment of a dToF apparatus (system)

Before a detailed description of the embodiments under reference of FIG. 1 is given, general explanations are made.

As also indicated in the outset, time-of-flight (ToF) includes a variety of methods that measure the time that an object, particle or wave needs for traveling a distance in a medium. ToF cameras can obtain depth measurements of the objects in the scene, e.g. for every pixel of an image simultaneously.

Generally, ToF technology may be grouped in two main techniques, namely indirect ToF (iTOF) and direct ToF (dTOF). An iToF camera indirectly obtains depth measurements by recovering the phase of a sampled correlation wave.

A dToF camera directly obtains the depth measurements by measuring the time-of-flight of the photons emitted by the light source and reflected in the scene, e.g. based on hundreds of short illumination pulses sent.

For dToF the roundtrip time of the emitted light can be detected on the basis of a peak detection performed on an event histogram, wherein the event histogram includes for each detected photon an event entry, which is filled in an associated time bin of the event histogram. The time bin corresponds to the detection time of the photon, wherein the detection time is measured from the emission time of the light pulse. By detecting the photons of multiple (hundred, thousands, millions, etc.) of emitted light pulses, the even histogram is filled and a peak which corresponds to the emitted light pulses can be detected, wherein the time bin of the detected pulse indicates the roundtrip time of the emitted photons. In the conventional dToF apparatus it is known to provide for each time of the histogram an own memory space, wherein this is provided for each pixels of a photo detection sensor.

Hence, a conventional dToF sensor may need a huge number of memories to store the events data of the event histogram. Thus, in conventional dToF sensors or apparatus, a significant big amount of silicon area may be occupied and it may be cumbersome and power-consuming to output the data out of the sensor for further processing.

It has been recognized that a compressing data solution for reducing the memory storage and the data transmission rate may be applied based on a pixel level compressive sensing/sampling in a dToF apparatus.

Consequently, some embodiments pertain to a time-of-flight apparatus, including a light detector for detecting light reflected from a scene, wherein the light detector has at least one light detection element; and circuitry configured to acquire light detection events for the at least one light detection element at selected points of time of a set of predetermined number of consecutive times, wherein the selection of the points of time is based on a time compressive sampling.

Some embodiments pertain also to a method for controlling a time-of-flight device, e.g. as discussed herein, including a light detector for detecting light reflected from a scene, wherein the light detector has at least one light detection element, the method comprising acquiring light detection events for the at least one light detection element at selected points of time of a set of predetermined number of consecutive times, wherein the selection of the points of time is based on a time compressive sampling.

The following description pertains to the time-of-flight apparatus and the method for controlling the time-of-flight apparatus.

Generally, the time-of-flight apparatus may be based on any of known ToF technologies, including direct ToF sensors, where the roundtrip of photons emitted and scattered from the scene is directly measured. Some embodiments pertain to indirect ToF sensors, where a phase shift of emitted and from the scene scattered light is measured for determining the distance, or the like.

The light source may include LEDs (light emitting diodes) or it may be based on laser elements, such as VCSELs (vertical cavity surface emitting lasers) or the like. The light source may be configured as PW (pulsed-wave) light source, which is configured to emit light pulses to the scene (region of interest or object or the like).

The light detector may be based on any type of known sensing technology for time-of-flight systems and may be based on, for example, CMOS (complementary metal-oxide semiconductor), CCD (charge coupled device), SPAD (single photon avalanche diode), CAPD (current assisted photodiode) technology or the like. It may include multiple light detection elements (photo diodes), which may be arranged in pixels, as it is generally known.

The circuitry (e.g. control) may include one or more (micro)processors, field gate processors, memory, and other components which are typically implemented in an electronic control of a time-of-flight system.

The circuitry (e.g. control) may be configured in hardware and/or in software.

As mentioned, the circuitry (e.g. control) drives the light detector to acquire light detection events e.g. photons detected from the sensor, for the at least one light detection element e.g. a pixel, a photo diode or the like, at selected points of time of a set of predetermined number of consecutive times e.g. a set of time bins, for example a set of N time bins.

The selected points of time may be the exact points of time in which an event is occurred e.g. the point of time in which the sensor detects the photons, or the like, or the selected points of time may each cover a time interval in which the event occurred. The selection of the points of time is based on a time compressive sampling, wherein the time compressive sampling may be performed based on a pixel level compressive sensing/sampling method. Furthermore, the implementation of a pixel level compressing data may be based on or implemented in a Light Imaging, Detection And Ranging (LIDAR) kind of dToF sensor, SPAD kind of dToF sensor or the like.

The pixel level compressive sensing/sampling method may have the effect of reducing the memory requirement of one pixel in the dToF sensor or apparatus, since, for example, the memory number for one pixel may be reduced from N, e.g. N memories for N time bins of an event histogram (corresponding to the predetermined number of consecutive times), to M (being smaller than N) or even to one (1). This may result to a significant reduction of the memory requirement and thus silicon area and it may also lead to reduced data transmission rate, i.e. bandwidth and power consumption, and even to a reduced data transmission burden.

In some embodiments, the time-of-flight apparatus further includes at least one memory for storing at least one of the light detection events. Moreover, in some embodiments the time-of-flight apparatus further includes a plurality of memories, wherein the amount of memories corresponds to the amount of selected points of time. Hence, in such embodiments, for example, for each light detection element the amount of memories may be provided. Moreover, the number or amount of selected points of time may be fixed and it may be less than the predetermined number of consecutive times.

In some embodiments, the events of the selected points of time are stored in one memory. In such embodiments, a further memory may be provided for storing the points of time in which an event has occurred, such that the events can be associated with the points of time at which they have been detected. This information of the detection time may also be stored in the one memory. In such embodiments, only one memory per light detection element may be provided. Hence, the memory requirement may be further reduced.

In some embodiments, the selection of the points of time is random. Hence, in some embodiments, the time compressive sampling includes generating a pseudo random bit sequence having a randomized bit value, and wherein the selection of the points of time is based on the randomized bit value. Of course, any other technology may be used for providing a random selection of the points of time. A pseudo random code generator may generate a bit sequence, i.e. a vector prc[1:N], which may have same size of time bins corresponding to the predetermined number of consecutive times and may fit to a original time bin time duration. The bit value may be a random value, e.g. 1 or 0, and may control whether the detected event can be stored or not in an associated memory. The mathematical formula of the process performed by the pseudo random code generator may be given by the following equation (1):

$$prc[1:N]*e[1:N]^T=c,$$

where prc[1:N] is the bit sequence generated by the pseudo random code generator, e[1:N1] is the events of all time bins to be reconstructed and c is the counter value under one pseudo random generator seeds.

Furthermore, to implement the reconstruction algorithm of the compressive sensing, M sets of different pseudo-random sequences may be used in some embodiments and the same process is repeated to get vector c[1:M], wherein the number of M sets of different pseudo-random sequences may corresponding to the number of selected points of time. With this process, a matrix function may be built using the following equation (2):

$$prc * e^T = \begin{pmatrix} prc_1 \\ prc_2 \\ ... \\ prc_{M-1} \\ prc_M \end{pmatrix} * \begin{pmatrix} e_1 \\ e_2 \\ ... \\ e_{N-1} \\ e_N \end{pmatrix} = \begin{pmatrix} c_1 \\ c_2 \\ ... \\ c_{M-1} \\ c_M \end{pmatrix},$$

where $prc_i$ (i=1, 2 ... M) is a N dimension vector which is the pseudo random bit sequence generated using $i^{th}$ set of seed, $c_i$(i=1, 2 ... M) is the value collected by an associated memory (e.g. a memory of an associated light detection element).

This matrix function may be solved under compressive sensing reconstruction algorithm, e.g. using L0-norm, as it is generally known.

In some embodiments, the predetermined number of consecutive times corresponds to a predetermined number of bins of a time-binned histogram. Each of the time bins of the histogram may correspond to a time interval, wherein events occurring within the associated time interval are filled into the associated time bin.

In some embodiments, the selection of the points of time corresponds to selecting bins of the predetermined number of bins.

In some embodiments, the circuitry (method) drives the light detector to acquire light detection events for the set of predetermined number of consecutive times.

In some embodiments, the circuitry (method) is further configured to determine a distance on the basis of the acquired light detection events, wherein further a depth map may be generated on the basis of multiple determined distances.

Of course, in some embodiments, the process discussed herein is performed for each of the light detection elements of the light detector, wherein a light detection element may correspond to a pixel of the light detector.

Returning to FIG. 1, on a high level, there is illustrated an embodiment of a dToF apparatus (system), which can be used for depth sensing or providing a distance measurement and which has a circuitry 8 which is configured to perform the methods as discussed herein and which forms a control of the ToF apparatus 1 (and it includes, not shown, corresponding processors, memory and storage as it is generally known to the skilled person).

The ToF apparatus 1 has a pulsed light source 2 and it includes light emitting elements (based on laser diodes), wherein in the present embodiment, the light emitting elements are narrow band laser elements.

The light source 2 emits pulsed light to a scene 3 (region of interest or object), which reflects the light. By repeatedly emitting light to the scene 3, the scene 3 can be scanned, as it is generally known to the skilled person. The reflected light is focused by an optical stack 4 to a light detector 5.

The light detector 5 has an image sensor 6, which is implemented based on multiple SPADs (Single Photon Avalanche Diodes) formed in an array of pixels (light detection elements) and a microlens array 7 which focuses the light reflected from the scene 3 to the image sensor 6 (to each pixel of the image sensor 6).

The light emission time information is fed from the light source 2 to the circuitry or control 8 including a time-of-flight measurement unit 9, which also receives respective time information from the image sensor 6, when the light is detected which is reflected from the scene 3. On the basis of the emission time information received from the light source 2 and the time of arrival information received from the image sensor 6, the time-of-flight measurement unit 9 computes a round-trip time of the light emitted from the light source 2 and reflected by the scene 3 and on the basis thereon it computes a distance d (depth information) between the image sensor 6 and the scene 3.

The depth information is fed from the time-of-flight measurement unit 9 to a 3D image reconstruction unit 10 of the circuitry 8, which reconstructs (generates) a 3D image of the scene 3, based on the depth information received from the time-of-flight measurement unit 9.

In the direct ToF sensor, the time of laser light flight is acquired by detecting an event, e.g. detected photon, when the light returns to the sensor and is detected by the sensor. To achieve high Signal to Noise Ratio (SNR) and high time resolution, the conventional way is dividing the whole detection time range into many small time bins, as will be described in FIG. 2.

Figure 2:
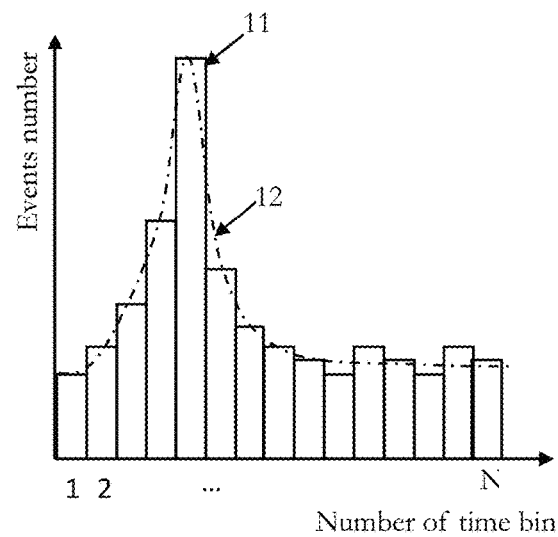
FIG. 2 illustrates an event histogram of one light detection element of a conventional light detector.

FIG. 2, generally, illustrates an event histogram of a light detector, in particular of one light detection element, e.g. a pixel, of the light detector 5, which shows events for each point of time, wherein for each detected photon a peak, for example peak 11, in the histogram is increased for the associated time bin. The abscissa represents the number of the time bins and the corresponding measuring time is the number of the time bins multiplied with time bin resolution. The ordinate represents the number of the detected events for the associated time bin. A dashed line 12 represents a fitted histogram curve, yielding peak 11. The peak 11 of the histogram is correlated with an arrival time of the detected photons emitted by the light source 2, which, thus, is indicative of the roundtrip delay of the emitted photons, and, thus, of the measured distance between the ToF image sensor 6 and the illuminated scene 3. Every detected event at different point of time within a detection time range is recorded in a corresponding time bin, wherein the start or recording events and emitting the light pulse are synchronized with each other. Typically, a time-to-digital-converter TDC converts the pixel signal output by each of the pixels of the light detected into a binary number, which, then, in turn is fed in the associated bin of histogram of FIG. 2, and in some embodiments, the circuitry and/or the sensor 6 include associated TDCs for the conversion of the signals generated by the pixels of the sensor 6 into events, which are fed into the histogram of FIG. 2

Once the recording of the events of the whole time range, i.e. once a histogram is completed, e.g. after measurement of several hundreds, thousands or millions (or any other number) of light pulses, as a general method which is also implemented in some embodiments, typically a first (most) significant peak of the histogram represents the time that an illumination (light) pulse needs to travel from the light source 2 to be scattered in the scene 3 and to return, to be detected in the image sensor 6 of the dToF apparatus 1, as is also illustrated in FIG. 2, which shows a peak 11 which is much higher than the other peaks. Hence, after recording the whole detection time range and reconstruct the histogram, the distance information can be derived by applying peak detection on the reconstructed histogram and determining the associated arrival time of the photons.

In the conventional approach, as discussed, typically, for every pixel, as many time bin memories are needed as many time bins are present to store the data of every time bin of the histogram (in FIG. 2. This number is N). This requires usually quite a lot memories and thus big silicon area, high bandwidth to support data throughput and huge power, as already discussed. The data processing is typically done on-chip instead of off-chip because of the huge amount data, and, thus, the data processing unit occupies quite a lot of silicon area.

Figure 3:
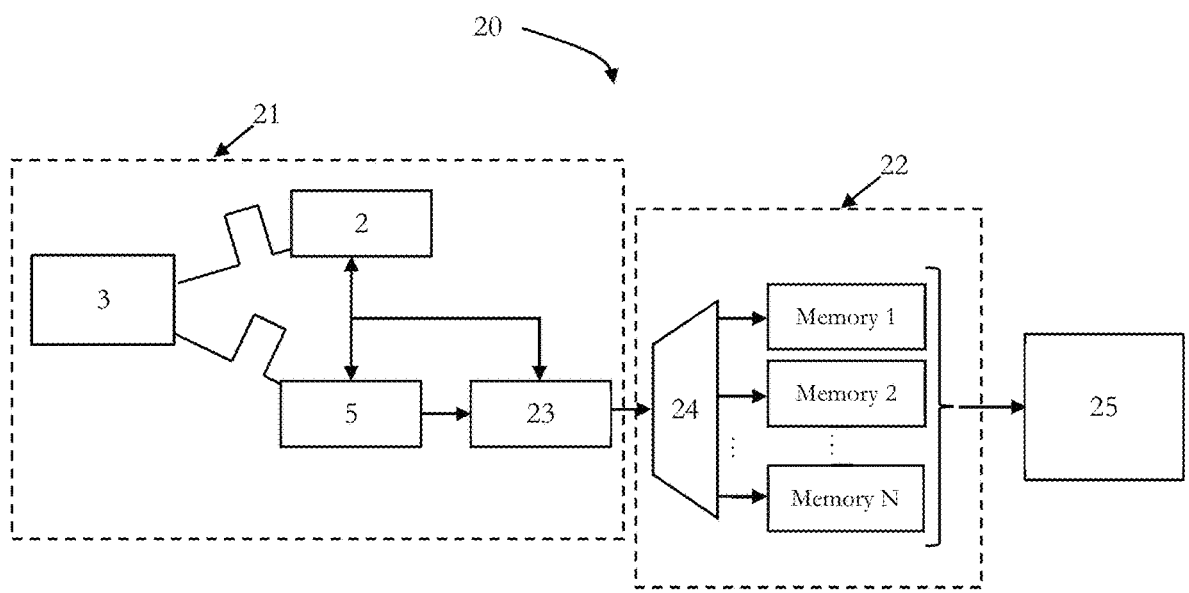
FIG. 3 illustrates an embodiment of a conventional dToF system and memory bank.

FIG. 3 illustrates a conventional dToF system 20 having a cToF circuitry 21 and memory bank 22, wherein for each time bin an own memory is provided, namely memory 1, memory 2, . . . , memory N, corresponding to the number of time bins N. The dToF system 20 is configured to perform a process 30, as will be described in FIG. 4.

The dToF circuitry 21 (in dashed line) includes light source 2 (such as discussed under reference of FIG. 1), a light detector 5 (such as discussed under reference of FIG. 1), a object 3 (such as discussed under reference of FIG. 1) and a Time-to-Digital-Converter (TDC) 23 for reconstructing the histogram.

The memory bank 22 (in dashed line) includes a De-multiplexer 24, which de-multiplexes the data received from the TDC 23 for storing the event data in the associated N memories (storage units) according to their arrival/detection time.

Moreover, a unit 25 for peak detection, ToF processing and depth map generation is provided which is fed with the event data from the memory bank 22.

Figure 4:
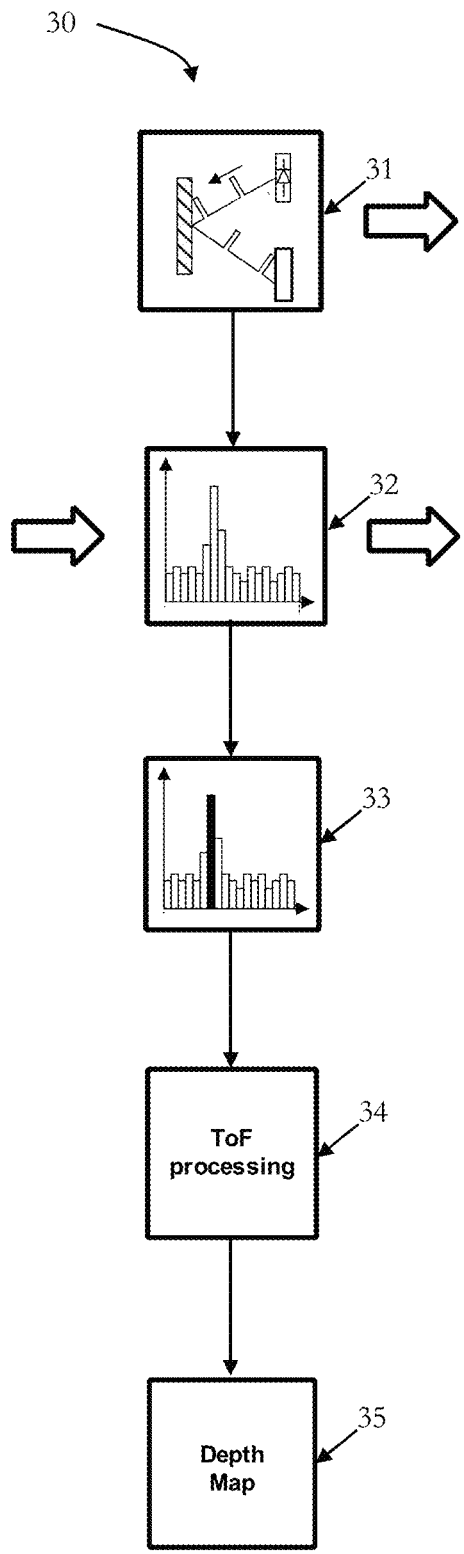
FIG. 4 illustrates the data processing structure of the conventional dToF apparatus.

The dToF system 20 performs the process 30, which is explained under reference of FIG. 4.

At 31, the light source 2 is driven to emit light pulses to an object/scene 3 and simultaneously the light detector 5 is driven to detect the reflected photons.

At 32, for each pixel of the light detector 5 the associated detected events are fed into the associated time bins of the histogram and, thus, they are stored the associated memories 1, . . . , N, as discussed above.

At 33, a peak detection is performed on the histogram data stored in the memory bank 22 (for each pixel), wherein the most significant peak of the time-binned histogram is selected, which directly indicates the roundtrip time of the light.

Based on the peak detected/selected from the time-binned histogram, during ToF processing at 34, an arrival time of the photos of the emitted light pulse can be detected, and, thus, a distance can be determined.

At 35, a depth map is generated on the basis of the determined distances of each pixel, and based on a scanning process of the object 3, wherein the depth map includes depth and distance information.

As mentioned above, this approach needs typically one memory for each time bin.

In the following, an embodiment of a dToF system 40 is discussed under reference of FIG. 5, wherein the number of needed memories is reduced.

Figure 5:
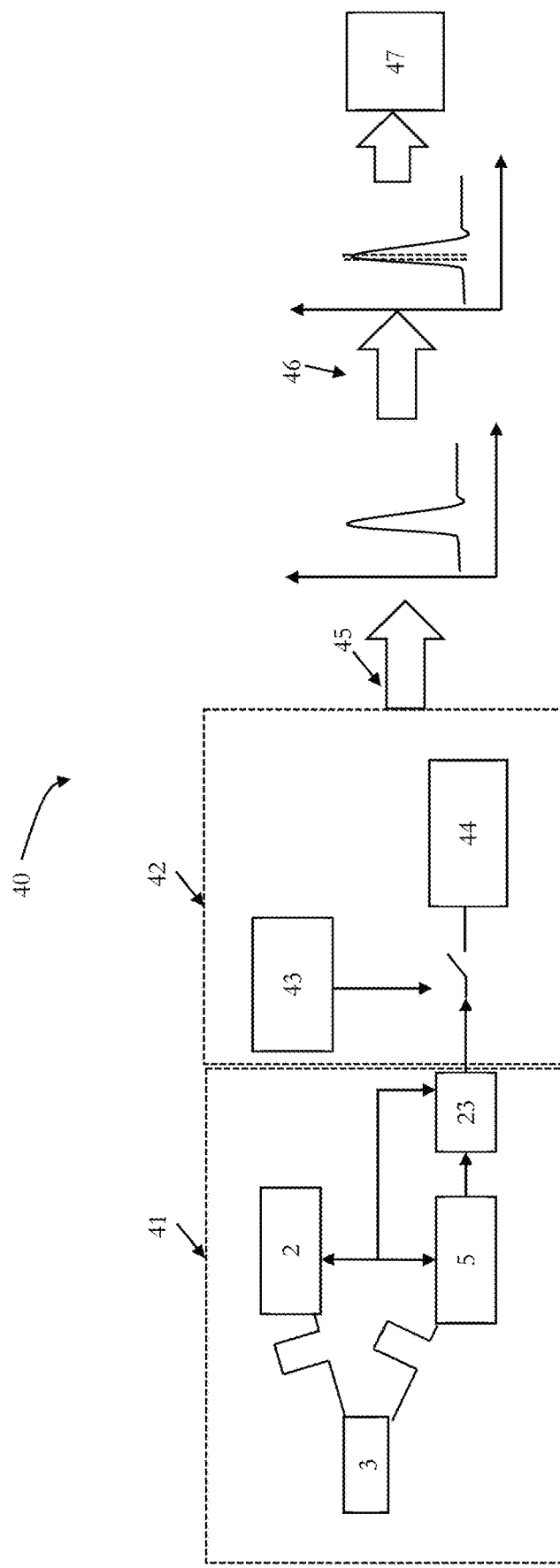
FIG. 5 illustrates an embodiment of a pixel level compressive sensing/sampling dToF system and a data compression process.

In FIG. 5 the dToF system 40 is shown with a first area 41 and a second 42, wherein the first are includes the light source 2, the object/scene 3, a light detector 5 and a TDC unit 23, as discussed above under reference of FIGS. 1 and 3, respectively, and, thus, it is referred to the disclosure above in that regard.

The second area 42 refers to data compression and it includes a pseudo random code generator 43 and a memory bank 44.

The pseudo random code generator 43 generates a bit sequence, i.e. vector prc[1:N], as discussed above, which has same size of the time bins and fits to the original time bin time duration. The bit value is a random value, 1 or 0, and controls whether the detected event can be stored or not in the memory 44 (e.g. "1" means storing an "0" means not storing).

If the detected event can be stored, instead of storing the detect event to corresponding time bin memory, the detected event is added to a single counter in this embodiment, such that all detected events which are indicated to be stored by the pseudo random code generator 43 are added together. The mathematical formula of the process performed by the pseudo random code generator 43 is given by the equation (1) discussed above.

Based on equation (1), a signal reconstruction 45 is performed and the histogram is reconstructed based on the data, which are stored in the single counter/memory of the memory bank 44.

A peak detection 46 is performed on the histogram, as discussed, and the selected peak indicates the roundtrip time of the light, such that the distance measurements can be derived, as discussed.

Finally, in a unit 47, ToF processing and depth map generation is performed.

The functions 43, 44, 45, 46 and 47 may also be implemented in a circuitry, such as circuitry 8 of FIG. 1.

As discussed above, to implement the reconstruction algorithm of the compressive sensing, M sets of different pseudo-random sequences may be used (see equation (2) above.

Such that the memory bank 44, may include for each pixel a number of M memories (instead of N memories corresponding to the overall number of time bins), although by using pipeline, i.e. reading out while collecting data, only one set of counter and memory is required in the embodiment of FIG. 5. Because of the data compression, i.e. M may be much smaller than N (size of the time bin) or even equal to 1, the memory requirement may be significantly reduced.

The embodiment of FIG. 5 is based on a LIDAR setup, where the TDC 23 is used to detect the event arrival time, wherein the practical implementation is not limited to this specific embodiment. Also the implementation of the decision process of the pseudo random code generator 43 may be implemented differently, as described under the reference of FIG. 9 further below.

Figure 6:
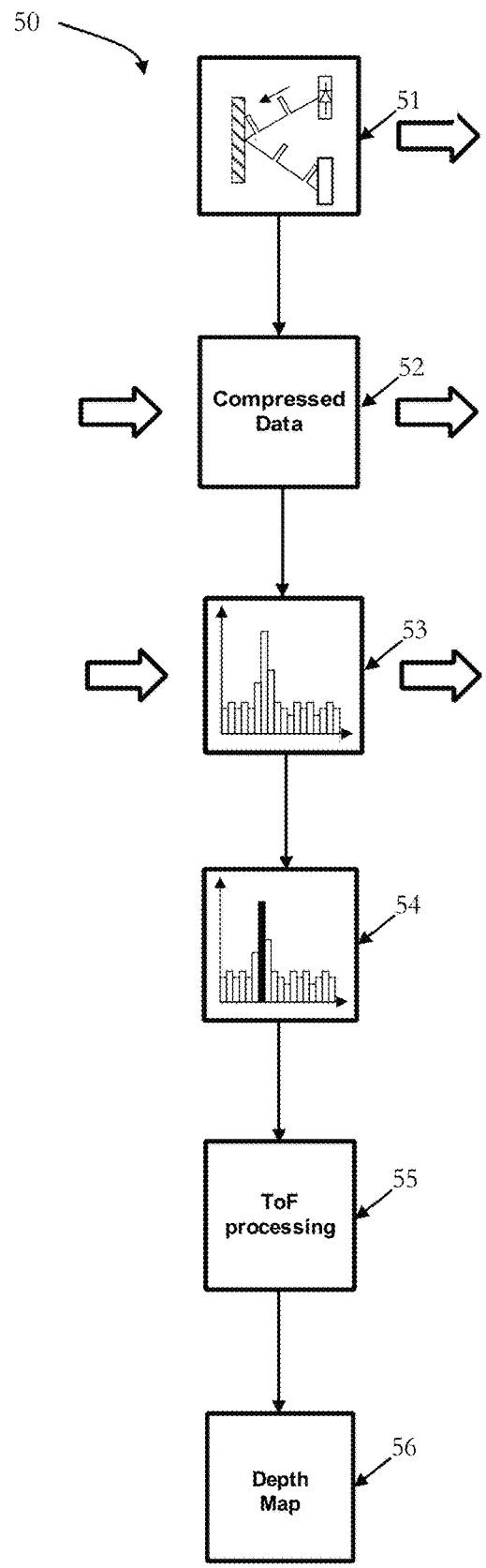
FIG. 6 illustrates a process for generating a depth map based on a pixel level data compression structure.

In the following a process 50 is discussed under reference of FIG. 6 illustrating a flow chart of process 50.

At 51, the light source 2 emits pulsed light to the scene (or object) 3, which reflects the light and the reflected light is detected in the light detector (sensor) 5 of the dToF apparatus 40, wherein the mission of the light pulses and the detection of them is synchronized, as discussed.

At 52, for every pixel of the light detector 5, as discussed, the compressed sampling of the events is performed, based on the random values output by the random code generator 43, and the events are stored in the memory 44. As discussed, the sub-sampling or compressive sensing/sampling includes storing all the detected events, which are indicated to be stored by the pseudo random code generator 43, with the corresponding points of time (e.g. time-binned histogram data) to one memory 44 and this process is described in more detail in FIG. 5. The compressed data will be transmitted to the host off-chip or be processed on chip to reconstruct the time-binned histogram at 53 of FIG. 6.

Then, at 54, the peak detection is performed based on the selected peak, as also discussed above, wherein the selected peak is the significant peak of the histogram data and is, thus, indicated of the roundtrip delay of the emitted light pulses, and, thus, of the distance.

At 55, ToF processing is performed, as discussed, and at 56 a depth map is generated, which includes the desirable depth and distance information. This pixel level data compression structure process 50 may lead to significant less number of memories, as discussed.

Figure 7:
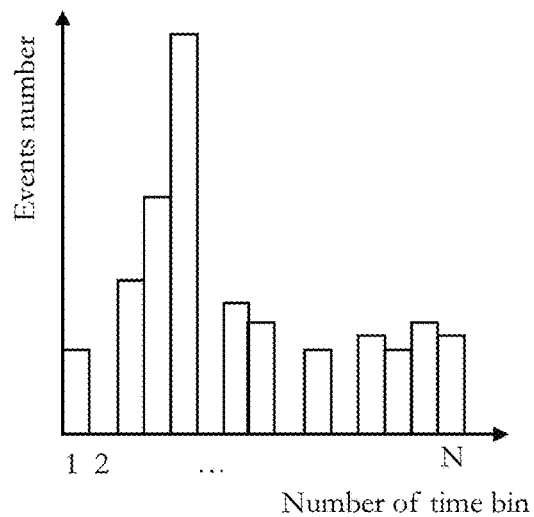
FIG. 7 illustrates an event histogram of a pixel level compressive sensing/sampling dToF apparatus (system)

FIG. 7 illustrates an event histogram, where a pixel level compressive sensing/sampling is performed, as discussed above, wherein the histogram of FIG. 7 illustrates an intermediate state. The abscissa represents the number of the time bins and the corresponding time is the number of the time bin multiplying with time bin resolution. The ordinate represents the number of the events.

As the pseudo-random code generator 43 generates a random mask which is applied to the time bin to decide whether the $i^{th}$ data bin is activated or not, compared to the histogram of FIG. 2, not all time bins are filled with events, which, for instance, also occur due to background light. Therefore, some of the bins are empty in FIG. 7. By taking a large number of events and randomly selecting the time bins to be filled, the main information, namely the main peak indicating the roundtrip time of the emitted light pulses, is also already present in FIG. 7, although some of the time bins are empty, since, typically, the signal of the light pulses is much stronger than the background light. For data processing, since the activated random mask is generally known, as discussed, and the sum of all the activated time bins is also known, the histogram of all time bins (including both activated and deactivated bins) can be reconstructed, and then the reconstructed time-binned histogram is used for peak detection and a following ToF processing, as discussed.

Moreover, storing the complementary data e.g. data from the deactivated bins and/or data regarding the point of time in which each event detected, in an extra counter/memory, a high Signal to Noise Ratio (SNR) without losing information, may be achieved in some embodiments.

Figure 8:
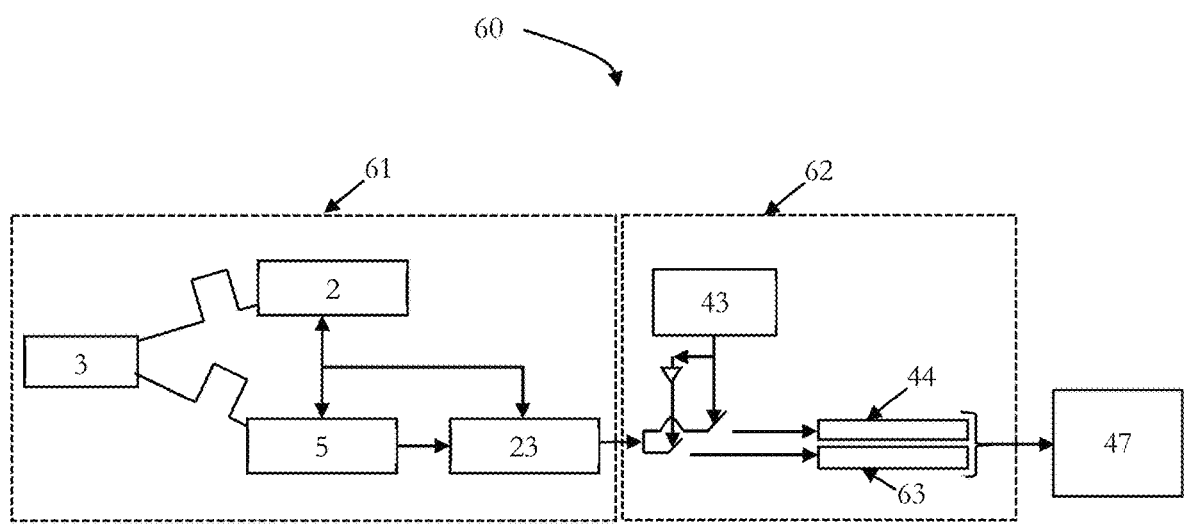
FIG. 8 illustrates an embodiment of a pixel level compressive sensing/sampling dToF apparatus (system) including a complementary memory.

FIG. 8 illustrates a pixel level compressive sensing/sampling dToF apparatus (system) 60 including a complementary memory 63.

The dToF system 60 is shown with a first area 61, which corresponds to area 41 of dToF system 40 of FIG. 5, and, thus, it is referred to the correspond description above in that regard, wherein the area 61 has the light source 2, the light detector 5 and the TDC 23, as discussed above.

A second area 62 basically corresponds to area 42 of dToF system 40 of FIG. 5, and, thus, it is referred to the correspond description above in that regard, wherein the area 62 has the pseudo random code generator 43 and the memory bank, which includes a single counter/memory 44, as discussed above, and an extra counter/memory 63 for storing the complementary data, for example data from the deactivated bins or the like. The related time-binned histogram is reconstructed based on the stored data, as described above. A unit 47 performs peak detection, ToF processing and depth map generation, as described under the reference of FIG. 5.

Figure 9:
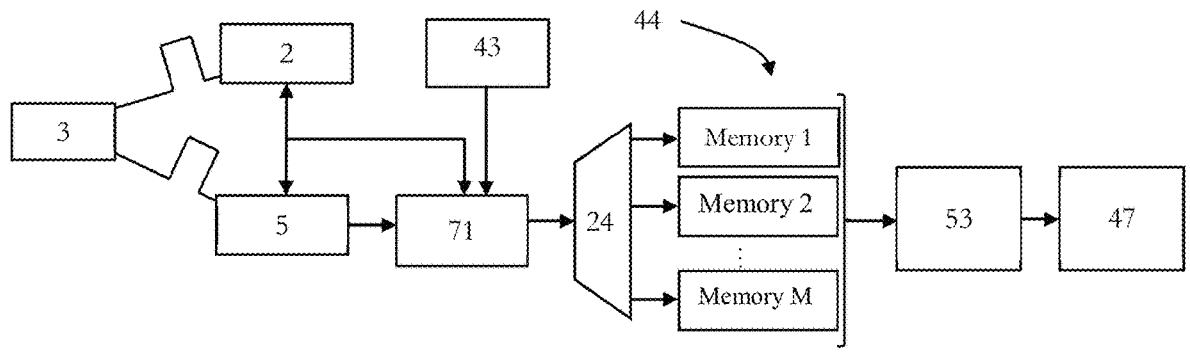
FIG. 9 illustrates two embodiments for implementing the decision process of the pseudo random code generator.
Figure 9:
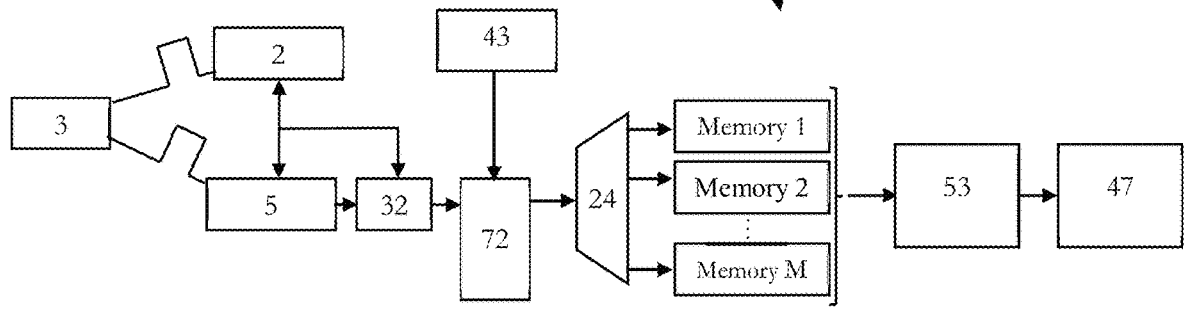

FIG. 9 illustrates two embodiments for implementing the decision process of the pseudo random code generator 43, wherein the overall setup corresponds to the setup of FIG. 5, wherein the memory 44 is divided into a number of memories 1, . . . , M, wherein N corresponds to "M" as discussed above, e.g. also for equation (1) (wherein M is smaller than N). Moreover, a de-multiplexer (as discussed for FIG. 3), is provided to distribute the event data to the memories 1, . . . , M. Block 53 performs reconstruction of the histogram, as discussed above under reference of FIG. 6, and block 47 performs peak detection, ToF processing and depth map generation, as described under the reference of FIG. 5.

Section a) of FIG. 9 illustrates a first embodiment of the decision process of the pseudo random code generator 43, which is implemented by a detector 71, e.g. an inverter. In this embodiment, a SPAD kind of dToF sensor may be used, where no real TDC can be used (SPAD and inverter), and thus the enable and/or disable of the pseudo random generator can be applied on the SPAD devices, inverters and so on, as long as the data can be bypassed. Thereby, the detector 71 selects according to the random values provided by the pseud random code generator 43 to the de-multiplexer 24, which in turns distributes the events the memories 1, . . . , M.

Section b) of FIG. 9 illustrates an embodiment of the decision process of the pseudo random code generator 43, which is implemented by a decision tree 72, wherein, for example, for a bit value equal to 1 the $i^{th}$ data bin is activated and a bit value equal to 0 the $i^{th}$ data bin is not activated and, thus, the according events are fed to the de-multiplexer 24, which distributes the events to the memories 1, . . . , M.

Figure 10:
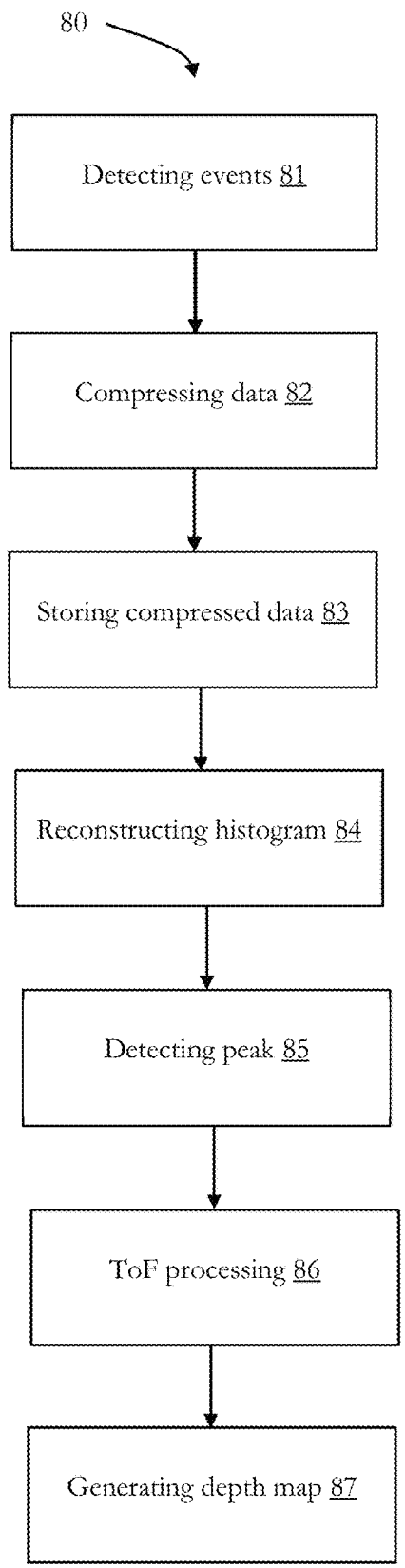
FIG. 10 is a flow chart of an embodiment of a method for controlling a (direct) time-of-flight apparatus (system).

A method 80 for controlling, e.g., the direct ToF device 1 of FIG. 1 or any other ToF system as described herein, is discussed in the following under reference of FIG. 10 showing a flow chart of the method 80 for controlling a ToF device.

At 81, the light source 2 and the light detector 5 are driven synchronously for detecting events in response to photons reflected from a scene and stemming from the light source emitting light pulses, as discussed.

At 82, data compression is performed based on sub-sampling or pixel level compressive sensing/sampling, as discussed herein, wherein, for example, the pseudo random code generator 43 generates a bit sequence and the randomized bit value controls whether the detected event can be stored or not in the memory, as discussed herein.

At 83, the compressed data are stored in the required amount of memories, which may be a single counter/memory, as discussed above. Thus, as discussed, instead of using individual memories for every time bin (as it is in the conventional approach the case), for example, only one memory is used to store the total events number of the activated time bin, as discussed herein.

At 84, a histogram of all time bins (which may include both activated and deactivated bins in some embodiments), is reconstructed based on the stored compressed data, as discussed herein.

At 85, peak detection is performed based on the reconstructed time-binned histogram, wherein the most significant peak of the time-binned histogram is determined, which is indicative of the roundtrip time of the light, such that the distance can be computed, as discussed.

At 86, ToF processing is performed for determining the distances for all pixels, as discussed.

At 87, a depth map is generated based on the obtained information from the ToF processing, as discussed.

Please note that the division of the circuit 8 into units 9 and 10 is only made for illustration purposes and that the present disclosure is not limited to any specific division of functions in specific units. For instance, the circuit 8 could be implemented by a respective programmed processor, field programmable gate array (FPGA) and the like.

The methods as described herein are also implemented in some embodiments as a computer program causing a computer and/or a processor to perform the method, when being carried out on the computer and/or processor. In some embodiments, also a non-transitory computer-readable recording medium is provided, that stores therein a computer program product, which, when executed by a processor, such as the processor described above, causes the methods described herein to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A time-of-flight apparatus, comprising:
a light detector for detecting light reflected from a scene, wherein the light detector has at least one light detection element; and
circuitry configured to:
acquire light detection events for the at least one light detection element at selected points of time of a set of predetermined number of consecutive times, wherein the selection of the points of time is based on a time compressive sampling.

(2) The time-of-flight apparatus of (1), further comprising at least one memory for storing at least one of the light detection events.

(3) The time-of-flight apparatus of (2), further comprising a plurality of memories, wherein the amount of memories corresponds to the amount of selected points of time.

(4) The time-of-flight apparatus of (2), wherein the events of the selected points of time are stored in one memory.

(5) The time-of-flight apparatus of anyone of (1) to (4), wherein the selection of the points of time is random.

(6) The time-of-flight apparatus of (5), wherein the time compressive sampling includes generating a pseudo random bit sequence having a randomized bit value, and wherein the selection of the points of time is based on the randomized bit value.

(7) The time-of-flight apparatus of anyone of (1) to (6), wherein the predetermined number of consecutive times corresponds to a predetermined number of bins of a time-binned histogram.

(8) The time-of-flight apparatus of (7), wherein the selection of the points of time corresponds to selecting bins of the predetermined number of bins.

(9) The time-of-flight apparatus of anyone of (1) to (8), wherein the circuitry is further configured to acquire light detection events for the set of predetermined number of consecutive times.

(10) The time-of-flight apparatus of anyone of (1) to (9), wherein the circuitry is further configured to determine a distance on the basis of the acquired light detection events.

(11) A method for controlling a time-of-flight apparatus including a light detector for detecting light reflected from a scene, wherein the light detector has at least one light detection element, the method comprising:
acquiring light detection events for the at least one light detection element at selected points of time of a set of predetermined number of consecutive times, wherein the selection of the points of time is based on a time compressive sampling.

(12) The method for controlling a time-of-flight apparatus of (11), further comprising storing at least one of the light detection events in at least one memory.

(13) The method for controlling a time-of-flight apparatus of (12), further comprising a plurality of memories, wherein the amount of memories corresponds to the amount of selected points of time.

(14) The method for controlling a time-of-flight apparatus of (12), wherein the events of the selected points of time are stored in one memory.

(15) The method for controlling a time-of-flight apparatus of anyone of (11) to (14), wherein the selection of the points of time is random.

(16) The method for controlling a time-of-flight apparatus of (15), wherein the time compressive sampling includes generating a pseudo random bit sequence having a randomized bit value, and wherein the selection of the points of time is based on the randomized bit value.

(17) The method for controlling a time-of-flight apparatus of anyone of (11) to (16), wherein the predetermined number of consecutive times corresponds to a predetermined number of bins of a time-binned histogram.

(18) The method for controlling a time-of-flight apparatus of (17), wherein the selection of the points of time corresponds to selecting bins of the predetermined number of bins.

(19) The method for controlling a time-of-flight apparatus of anyone of (11) to (18), further comprising acquiring light detection events for the set of predetermined number of consecutive times.

(20) The method for controlling a time-of-flight apparatus of anyone of (11) to (19), further comprising determining a distance on the basis of the acquired light detection events.

The invention claimed is:

1. A time-of-flight apparatus, comprising:
a light detector configured to detect light reflected from a scene as a light detection event, wherein the light detector has at least one light detection element; and
circuitry configured to:
store light detection events at only selected points of time for the at least one light detection element, the selected points of time being selected from among a set of predetermined number of consecutive times corresponding to a predetermined number of bins of a time-binned histogram, wherein selection of the selected points of time for acquiring the light detection events is based on a time compressive sampling of the light detection events and corresponds to selecting bins among the predetermined number of bins to activate for the time-binned histogram.

2. The time-of-flight apparatus of claim 1, further comprising at least one memory for storing at least one of the light detection events.

3. The time-of-flight apparatus of claim 2, further comprising a plurality of memories, wherein the amount of memories corresponds to the amount of selected points of time.

4. The time-of-flight apparatus of claim 2, wherein the light detection events of the selected points of time are stored in one memory.

5. The time-of-flight apparatus of claim 1, wherein selection of the selected points of time is random.

6. The time-of-flight apparatus of claim 5, wherein the time compressive sampling includes generating a pseudo random bit sequence having a randomized bit value, and wherein the selection of the selected points of time is based on the randomized bit value.

7. The time-of-flight apparatus of claim 1, wherein the circuitry is further configured to drive the light detector to acquire light detection events for the set of predetermined number of consecutive times.

8. The time-of-flight apparatus of claim 1, wherein the circuitry is further configured to determine a distance on the basis of the acquired light detection events.

9. The time-of-flight apparatus of claim 1, wherein selecting bins among the predetermined number of bins to activate comprises selecting bins among the predetermined number of bins to be filled.

10. The time-of-flight apparatus of claim 1, wherein selecting bins among the predetermined number of bins to activate comprises selecting fewer than all bins among the predetermined number of bins.

11. A method for controlling a time-of-flight apparatus including a light detector for detecting light reflected from a scene as a light detection event, wherein the light detector has at least one light detection element, the method comprising:
storing light detection events at only selected points of time for the at least one light detection element, the selected points of time being selected from among a set of predetermined number of consecutive times corresponding to a predetermined number of bins of a time-binned histogram, wherein selection of the selected points of time for acquiring the light detection events is based on a time compressive sampling of the light detection events and corresponds to selecting bins among the predetermined number of bins to activate for the time-binned histogram.

12. The method for controlling the time-of-flight apparatus of claim 11, further comprising storing at least one of the light detection events in at least one memory.

13. The method for controlling the time-of-flight apparatus of claim 12, further comprising a plurality of memories, wherein the amount of memories corresponds to the amount of selected points of time.

14. The method for controlling the time-of-flight apparatus of claim 12, wherein the light detection events of the selected points of time are stored in one memory.

15. The method for controlling the time-of-flight apparatus of claim 11, wherein selection of the selected points of time is random.

16. The method for controlling the time-of-flight apparatus of claim 15, wherein the time compressive sampling includes generating a pseudo random bit sequence having a randomized bit value, and wherein the selection of the selected points of time is based on the randomized bit value.

17. The method for controlling the time-of-flight apparatus of claim 11, further comprising determining a distance on the basis of the acquired light detection events.

18. The method for controlling the time-of-flight apparatus of claim 11, wherein selecting bins among the predetermined number of bins to activate comprises selecting bins among the predetermined number of bins to be filled.

19. The method for controlling the time-of-flight apparatus of claim 11, wherein selecting bins among the predetermined number of bins to activate comprises selecting fewer than all bins among the predetermined number of bins.

\* \* \* \* \*